United States Patent
Engel et al.

(10) Patent No.: US 6,925,225 B2
(45) Date of Patent: Aug. 2, 2005

(54) DEVICE FOR FLAT ILLUMINATION OF AN OBJECT FIELD

(75) Inventors: Thomas Engel, Niedernissa (DE); Wolfgang Harnisch, Lehesten (DE); Juergen Heise, Jena (DE)

(73) Assignee: Carl Zeiss Microelectric Systems GmbH, Jena (DE)

( * ) Notice: Subject to any disclaimer, the term of this patent is extended or adjusted under 35 U.S.C. 154(b) by 0 days.

(21) Appl. No.: 10/473,834

(22) PCT Filed: Jun. 26, 2002

(86) PCT No.: PCT/EP02/07039

§ 371 (c)(1),
(2), (4) Date: Feb. 19, 2004

(87) PCT Pub. No.: WO03/003098

PCT Pub. Date: Jan. 9, 2003

(65) Prior Publication Data
US 2004/0135093 A1 Jul. 15, 2004

(30) Foreign Application Priority Data
Jun. 26, 2001 (DE) ......................... 101 30 821

(51) Int. Cl.$^7$ ................................. G02B 6/26
(52) U.S. Cl. ..................... 385/31; 385/901; 600/17; 356/345
(58) Field of Search ............. 385/31, 115–121, 385/901; 600/13, 17, 108; 356/345, 353, 460

(56) References Cited

U.S. PATENT DOCUMENTS

| 4,818,049 A | | 4/1989 | Assenheim et al. |
| 5,395,362 A | * | 3/1995 | Sacharoff et al. ........... 600/108 |
| 6,061,133 A | * | 5/2000 | Freischlad ................... 356/460 |

FOREIGN PATENT DOCUMENTS

| DE | 199 46 594 | 4/2001 |
| EP | 0 435 825 | 7/1991 |
| GB | 02 049 985 | 12/1980 |
| JP | 58-225347 | 12/1983 |

* cited by examiner

Primary Examiner—Phan T. H. Palmer
(74) Attorney, Agent, or Firm—Reed Smith LLP

(57) ABSTRACT

The invention is directed to a device for flat illumination of an object field in an optical instrument and to an optical instrument with a device of this kind. Optical instruments of this type are, for example, microscopes, including microlithography simulation microscopes in which a flat illumination, i.e., illumination extending beyond a singular object point, of the object to be examined is required. The device comprises a laser light source and a light-conducting cable with at least one optical fiber through which the light from the laser light source is guided to the object field. The optical fiber is constructed and dimensioned in such a way that the intensity of the illumination light within the cross section of the optical fiber becomes increasingly more uniform along the path from the input-side end to the output-side end, and the illumination light is directed from the output-side end of the optical fiber to the object with substantially homogeneous intensity distribution.

3 Claims, 1 Drawing Sheet

DEVICE FOR FLAT ILLUMINATION OF AN OBJECT FIELD

CROSS-REFERENCE TO RELATED APPLICATIONS

This application claims priority of PCT application No. PCT/EP02/07039, filed Jun. 26, 2002 and German application No. 101 30 821.3, filed Jun. 26, 2001, the complete disclosures of which are incorporated herein by reference.

BACKGROUND OF THE INVENTION a) Field of the Invention

The invention is directed to a device for flat illumination of an object field in an optical instrument and to an optical instrument with a device of this kind. Optical instruments of this type are, for example, microscopes, including microlithography simulation microscopes in which a flat illumination, i.e., illumination extending beyond a singular object point, of the object to be examined is required.

b) Description of the Related Art

In instruments of the type mentioned above, the homogeneity of the illumination of the object field is particularly important as regards the quality of the recorded images of the object field. To this extent, the problem with using laser light sources for generating the illumination light is that the intensity of the light is unevenly distributed within the beam cross section, which has a disadvantageous effect on image quality.

Other variations in the brightness of the illumination which disadvantageously affect the image quality and, therefore, the results of evaluation are caused by low-frequency amplitude modulations or coherent noise (speckle) in coherent light sources. Therefore, an important concern consists in reducing these interfering influences as far as possible.

For this purpose, in a solution which is already known, a rotating diffusion screen or scatter disk is arranged in the beam path between the laser light source and the object field in order to reduce the intensity modulation of the laser light.

Further, it is known to use light-conducting cable in connection with optical instruments. These light-conducting cables have been used heretofore to transmit light from the source to the object in the most flexible manner possible. Usually, the light-conducting cable is used to transfer illumination light within the spectral range from longwave ($\lambda$>400 nm) to infrared.

OBJECT AND SUMMARY OF THE INVENTION

On this basis, it is the primary object of the invention to provide another possibility for homogenizing the illumination of an extended object field.

For this purpose, a device of the type mentioned in the beginning comprises a laser light source for generating illumination light and a light-conducting cable with at least one optical fiber through which the illumination light reaches the object. The optical fiber is constructed and dimensioned in such a way that the intensity distribution of the illumination light within its cross section becomes increasingly more uniform along the path from the input-side end to the output-side end and the illumination light is directed from the output-side end of the optical fiber to the object with substantially homogeneous intensity distribution.

The effect achieved in this way is similar to that of a rotating scatter disk. In contrast to the rotating scatter disk, however, the inventive solution is a static system offering particularly extensive protection against interference due to the absence of moving components. In addition, the drive device and associated controls required for a rotating scatter disk are dispensed with.

The light-conducting cable can be arranged in a flexible manner with no special restrictions with respect to its position, so that greater compactness can also be achieved in instrument construction in contrast to a scatter disk.

A reduction in the intensity modulation over the beam cross section can be realized by means of different configuration parameters of the light-conducting cable. This can be accomplished, for example, by predetermining the length of the optical fiber and/or the diameter of the optical fiber and/or the material used for the optical fiber, so that the spatial coherence of the laser light is destroyed. By reduction of the intensity modulation is meant herein a reduction of the intensity variations over the cross section at the output of the light-conducting cable to less than 10%, preferably to less than 1%.

In a preferred construction, the laser light source generates light in the UV range, preferably in a wavelength of 386 nm, 365 nm, 266 nm, 257 nm, 248 nm, 213 nm, 211 nm or 193 nm at a bandwidth of about ±2 nm. The optical fiber used is preferably a multimode light guide. In this case, the diameter of the light-conducting part has a multiple of the wavelength of the light coming from the source.

It has proven advantageous when the length of the optical fiber is at least 30 cm. With excessive length, the intensity losses are too high so that the maximum length should currently be limited for technical reasons preferably to about 100 cm. Insofar as optical fibers with greater stability or fewer losses are available, their lengths can also be greater.

In another advantageous construction of the invention, the light source is a pulsed laser light source. In comparison to scatter disks, it is to be observed when using optical fibers according to the invention that homogenization is successfully achieved already with small pulse numbers, so that an illumination apparatus of this kind is very well suited to optimization of measured throughput in measuring processes.

To further improve and homogenize the illumination, one or more rotating scatter disks can also be arranged in front of and/or behind the light-conducting cable.

When two scatter disks are provided, it is advantageous as regards homogenization when they rotate in opposite directions. In order to achieve the scattering effect, the scatter disks are granular, for example. When using a pulsed laser light source, the granulation, i.e., the size of the individual grains, is adapted to the pulse number and pulse duration and to the rotating speed of the scatter disk. It would also be conceivable to adapt to the characteristic coherence length. The purpose of this adaptation is so that the light can pass essentially through the same point on the scatter disk during one pulse, e.g., during 10 ns, i.e., the scatter disk is quasi-stationary with respect to its optical effect, whereas rotation continues in a noticeable manner during the time segment between every two pulses. Accordingly, the granulation of the scatter disk as well as the non-homogeneity of intensity over the beam cross section of the light source are averaged. A holographic profile can also be used instead of granulation.

The invention further proposes an optical instrument, particularly a microlithography simulation microscope, which comprises an observation device which can be oriented to an object field and an illumination device of the type mentioned above.

The illumination device is preferably arranged next to the observation device as a structural unit. The illumination device is connected to the observation device by a device for conducting light. This can be carried out, for example, by deflecting mirrors or another light-conducting cable.

Of course, it is also possible to couple light directly into the observation device via the light-conducting cable of the illumination device.

The coupling of light into the observation device can be carried out using the principle of incident light or transmitted light.

In another advantageous construction of the invention, the observation device is configured so as to scan a plurality of different object points in the object field.

BRIEF DESCRIPTION OF THE DRAWING

In the following, the invention will be described more fully with reference to an embodiment example shown in a drawing, FIG. 1, which shows a microscope with an illumination device according to the invention.

DESCRIPTION OF THE PREFERRED EMBODIMENTS

Figure 1:
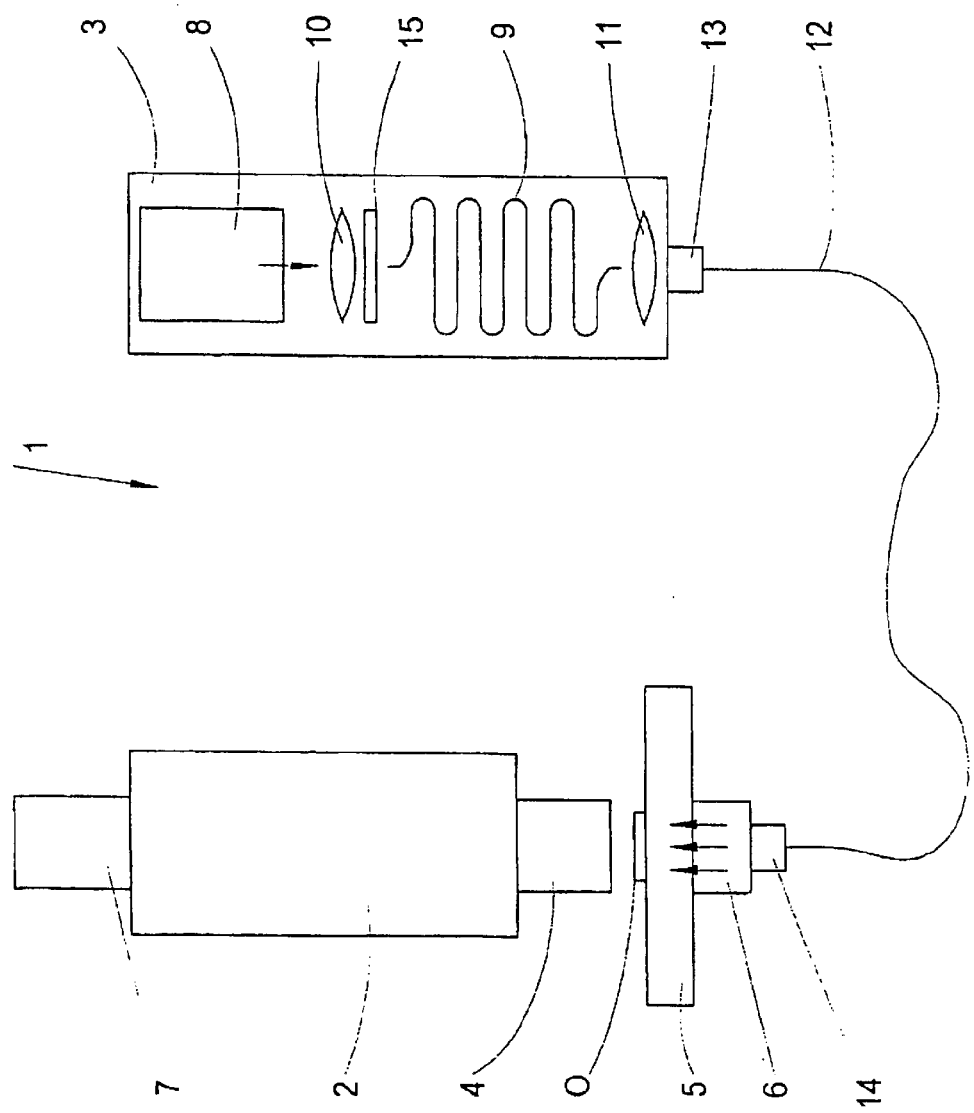

The microscope 1, which is constructed in this case as a microlithography simulation microscope by way of example, is outfitted with an observation device 2 and an illumination device 3. In this way, for example, masks for semiconductor or wafer fabrication as well as other objects can be examined.

The observation device 2 comprises an objective 4 which is directed toward a movable table 5 with a receptacle for an object O to be examined. Further, illumination optics 6 are provided for uniform illumination of a flat object field on the object O. In the present embodiment example, illumination is provided based on the principle of transmitted light. However, it is also possible to illuminate and examine the object O based on incident light.

The observation device 2 shown here is constructed for scanning a plurality of object points in the object field. Image information obtained in this way is recorded in a video camera 7 connected to the observation device 2. However, other recording media outfitted with an image-recording sensor could also be used instead of the video camera 7. Beyond this, the observation device 2 can make possible visual observation of the flat-illuminated object field when constructed in a suitable manner.

The illumination device 3 mentioned above which is shown here as a separate structural unit is associated with the microscope 1. The illumination device 3 comprises a laser light source 8 for generating the light by which the object field is to be illuminated. The laser light source 8 generates coherent light in the UV range and is constructed in this case, by way of example, as a pulsed laser light source.

Before the light generated by the laser light source 8 strikes an object O, it is conducted through a light-conducting cable 9. The light-conducting cable 9 comprises one or more optical fibers and serves to interrupt the coherence of the light emitted by the laser light source 8. There are different possibilities for accomplishing this. For example, a homogenization of the intensity distribution over the cross section of the optical fiber depends on length, diameter and material. Through a specific selection of these configuration parameters, an appreciable homogenization of the intensity distribution is caused over the cross section between the input (the end on the input side) and the output (the emission-side end) of the light-conducting cable.

A light-conducting cable 9 with an individual optical fiber constructed as a multimode light guide is used in the embodiment example shown. The length of the optical fiber is 30 to 100 cm, preferably 50 to 60 cm. The light-conducting cable 9 can be arranged in the illumination device 3 in any manner desired. Also, fiber portions extending to and fro can be bundled so as to form a kind of multiwire cable.

Further, the illumination device 3 comprises an optical in-coupling device 10 in the form of a lens or lens arrangement, possibly also with a diaphragm, by which the light of the laser light source 8 is coupled into the light-conducting cable 9. Further, an optical out-coupling device 11 is provided. This again comprises one or more lenses and possibly additional diaphragms.

Another light-conducting cable 12 serves to conduct the light emitted by the illumination device 3 to the object O via the optical out-coupling device 11. Suitable optical couplers 13 and 14 are provided at the ends of the other light-conducting cable 12 for connecting to the illumination optics 6 and to the illumination device 3.

A highly homogeneous illumination of an object field on the object O is achieved already by the configuration described above. In particular, the occurrence of coherent noise is sharply reduced through the light-conducting cable 9, so that interfering influences due to the coherent noise or speckle are reduced or even prevented in the image of the object field.

Instead of the other light-conducting cable 12 mentioned above, the light can also be transmitted by deflecting mirrors. Moreover, it is possible to connect the illumination device 3 directly to the illumination optics 6.

Further, in the present embodiment example a rotating scatter disk 15 is provided in the illumination device 3. In this case, the rotating scatter disk 15 is positioned between the optical in-coupling device 10 and the light-conducting cable 9. The associated drive device by which the scatter disk 15 can be set in rotation is not shown.

The rotational speed of the scatter disk is selected in such a way that this scatter disk is quasi-stationary for the duration of a laser pulse, e.g., 10 ns, but is moved further in the interval between two laser pulses before the next laser pulse is emitted (repetition frequency is, e.g., 200 Hz). Successive pulses accordingly pass through different portions of the scatter disk 15.

Speeds in the range of several centimeters per second are sufficient for the repetition frequency mentioned above. The grain size of the granulation is in the range of 0.1 mm.

A second scatter disk (not shown) can be provided in addition to reinforce the homogenizing effect caused by the scatter disk 15. This second scatter disk is stationary or rotates in the opposite direction depending on the construction of the invention. When the second scatter disk is stationary, it should advantageously be arranged in front of the rotating scatter disk considered in the radiating direction.

The arrangement of the scatter disks in relation to the light-conducting cable 9, the optical in-coupling device 10 and the optical out-coupling device 11 can also be relatively freely selected, i.e., the scatter disk 15 can be arranged in front of or behind these components. This also applies to any additional scatter disks which may possibly be provided in the illumination device 3. Scatter disks provided with holographic patterns which are configured with respect to a homogenizing effect over the beam cross section can also be used instead of granular scatter disks.

In another modification of the embodiment example, it is also possible to integrate the optical out-coupling device 11 in the illumination optics 6, so that the light-conducting cable 9 takes over the function of the other light-conducting cable 12.

The illumination device 3 described in connection with the microscope 1 can also be used for other purposes, specifically, for example, anywhere that the most homogeneous possible flat illumination of an extended object field or measurement field with an optical instrument is desired. An example for this would be a device for photolithographic exposure of semiconductor substrates or wafers.

While the foregoing description of the drawings represent the present invention, it will be obvious to those skilled in the art that various changes may be made therein without departing from the true spirit and scope of the present invention.

Reference Numbers:

1 microscope
2 observation device
3 illumination device
4 objective
5 table
6 illumination optics
7 video camera
8 laser light source
9 light-conducting cable
10 in-coupling device
11 out-coupling device
12 light-conducting cable
13, 14 couplers
15 scatter disk
O object

What is claimed is:

1. A device for flat illumination of an object field in an optical instrument and to an optical instrument for observation of objects, particularly a microscope, comprising:

a laser light source for generating illumination light; and a light-conducting cable with at least one optical fiber through which the illumination light is guided to the object;

said optical fiber being constructed and dimensioned in such a way that the intensity distribution of the illumination light being directed from the output-side end of the optical fiber to the object with substantially homogeneous intensity distribution;

wherein at lease one rotating scatter disk is arranged in front of and/or behind the light-conducting cable and two scatter disks with opposite rotating directions are provided.

2. A device for flat illumination of an object field in an optical instrument and to an optical instrument for observation of objects, particularly a microscope, comprising:

a laser light source for generating illumination light; and a light-conducting cable with at least one optical fiber through which the illumination light is guided to the object;

said optical fiber being constructed and dimensioned in such a way that the intensity distribution of the illumination light being directed from the output-side end of the optical fiber to the object with substantially homogeneous intensity distribution;

wherein at lease one rotating scatter disk is arranged in front of and/or behind the light-conducting cable and two scatter disks are provided, one of which rotates while the second is stationary, and the stationary scatter disk is arranged in front of the rotating scatter disk considered in the radiating direction.

3. A device for flat illumination of an object field in an optical instrument and to an optical instrument for observation of objects, particularly a microscope, comprising:

a laser light source for generating illumination light; and a light-conducting cable with at least one optical fiber through which the illumination light is guided to the object;

said optical fiber being constructed and dimensioned in such a way that the intensity distribution of the illumination light being directed from the output-side end of the optical fiber to the object with substantially homogeneous intensity distribution;

wherein at lease one rotating scatter disk is arranged in front of and/or behind the light-conducting cable and two scatter disks with opposite rotating directions are provided and the scatter disks are provided with a granular or holographically generated, optically active structure.

* * * * *